US008386577B2

(12) United States Patent
Hickson et al.

(10) Patent No.: US 8,386,577 B2
(45) Date of Patent: Feb. 26, 2013

(54) SELECTION OF COMMUNICATION PROTOCOL FOR MESSAGE TRANSFER BASED ON QUALITY OF SERVICE REQUIREMENTS

(75) Inventors: Andrew I. Hickson, West Wellow (GB); Simon A J Holdsworth, Andover (GB); Timothy N. Holloway, Andover (GB); Peter R. MacFarlane, Winchester (GB); Michael J. Ward, New Haven, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/348,899

(22) Filed: Jan. 12, 2012

(65) Prior Publication Data

US 2012/0117172 A1 May 10, 2012

Related U.S. Application Data

(63) Continuation of application No. 10/016,906, filed on Dec. 14, 2001, now Pat. No. 8,122,118.

(51) Int. Cl.
*G06F 15/16* (2006.01)
*G06F 15/173* (2006.01)

(52) U.S. Cl. ........................................ 709/206; 709/224

(58) Field of Classification Search ........................ None
See application file for complete search history.

(56) References Cited

U.S. PATENT DOCUMENTS 8,122,118 B2 * 2/2012 Hickson et al. ............... 709/224

* cited by examiner

*Primary Examiner* — John B. Walsh
(74) *Attorney, Agent, or Firm* — Steven M. Greenberg, Esq.; Carey, Rodriguez, Greenberg & O'Keefe

(57) ABSTRACT

Provided are a message brokering systems, computer program products and methods for communication in a publish/subscribe environment in which publisher application programs send messages to subscriber application programs via one or more message brokers, the method comprising the following steps: responsive to receipt of a published message at a message broker, referring to characteristics of the received message and subscriber-specified quality of service requirements to determine an appropriate quality or service for onward transmission of the message; selecting a communication protocol in accordance with the determined quality of service; and transmitting the message using the selected communication protocol. Information relating to the quality of service requirements of a first message broker's subscribers is passed to other brokers and subsequently used for selection of an appropriate communication protocol for transmitting messages between the brokers.

16 Claims, 2 Drawing Sheets

SELECTION OF COMMUNICATION PROTOCOL FOR MESSAGE TRANSFER BASED ON QUALITY OF SERVICE REQUIREMENTS

CROSS-REFERENCE TO RELATED APPLICATIONS

This application is a Continuation of U.S. application Ser. No. 10/016,906, filed Dec. 14, 2001, entitled "SELECTION OF COMMUNICATION PROTOCOL FOR MESSAGE TRANSFER BASED ON QUALITY OF SERVICE REQUIREMENTS," the entirety of which is incorporated herein by reference. This patent application is related to commonly assigned, co-pending patent application U.S. Ser. No. 10/016,935, which is incorporated herein by reference.

FIELD OF INVENTION

The present invention relates to message communication within a data processing network and, in particular, to enabling communication partners to use a different communication protocol for different messages.

BACKGROUND

Within a message delivery system, messages may generally be delivered through a network of servers ("brokers") which provide routing and formatting services. Such communications often have an associated "quality of service" which determines the manner in which the brokers process the message. Known quality of service characteristics include factors such as network bandwidth requirements, throughput, latency, error rate, compression, encryption, or the amount of memory or buffer space required for a data flow.

Many message brokers support the publish/subscribe communication paradigm. This involves a set of one or more publishers sending communications to a set of one or more subscribers who have registered their interest in receiving communications of that type. Publish/subscribe allows subscribing users to receive the very latest information in an area of interest (for example, stock prices or events such as news flashes or store specials). A typical publish/subscribe environment has a number of publisher applications sending messages to a number (potentially a very large number) of subscriber applications located on remote computers across the network. Publish/subscribe solutions typically include one or more message brokers located at a communications hub via which the publishers and subscribers communicate. In this case, the subscribers notify the broker(s) of the message types they wish to receive and this information is stored at the broker. Publishers send their messages to the broker, which compares the message type (for example, checking message header topic fields or checking message content) with its stored subscriber information to determine which subscribers the message should be forwarded to. The message broker may perform additional functions, such as filtering, formatting or otherwise processing received messages before forwarding them to subscribers.

Currently, typical message brokers communicate with each other using a single transport mechanism. This mechanism may not have the most desirable behaviour for all qualities of service, with the result that many messages are not processed in the most efficient manner. Broker software may implement higher qualities of service than that provided by the communication mechanism itself, but this is typically complicated and can result in systems which are difficult to administer. The alternative is to always use a transport mechanism which supports the highest qualities of service, but this incurs overheads when processing messages which only require lower qualities of service such that many messages are not handled in the most efficient manner.

U.S. Pat. No. 5,537,417 discloses a socket structure for a multi-protocol environment which moves the decision on which protocol to use for communication until the time that the connection is actually made between nodes in the network. This is an alternative to a socket having a single associated protocol which is fixed at the time the socket structure is created. A single protocol is used for all communications via the connection.

U.S. Pat. No. 5,995,503 discloses a system in which routers within a network calculate a communication path through the network which can satisfy a quality of service request. The calculations are performed based on information about available link resources and resource reservations for the network nodes. U.S. Pat. No. 5,995,503 discloses identifying an acceptable network path and avoiding links which have inadequate resources, but there is no disclosure of route or protocol selection to achieve improved efficiency when a high quality of service is not required.

IBM Corporation's book "IBM Lakes—An Architecture for Collaborative Networking", R. Morgan Publishing, UK, 1994, describes a framework for real-time multimedia communications. Chapter 1 "Architecture fundamentals" includes a disclosure of communication end point applications exchanging information about their quality of service requirements. The Lakes components then select different network paths (link types and channels) and allocate resources according to the specified quality of service requirements, enabling multimedia applications to exchange multimedia data for effective collaborative working. Although Lakes provided invaluable support for collaborative multimedia applications, it was not applicable to communications between message brokers in a publish/subscribe environment (see below) in which endpoint applications typically have no dedicated end-to-end connection.

U.S. Pat. No. 6,101,545 discloses a message handling system in which a sender can specify a message delivery type to designate whether a message is delivery critical or time critical. A message delivery selector then selects a protocol (for example, TCP or UDP) based on the message delivery type. Thus, the sender of a message can specify a message delivery type which is analyzed and used to control selection of a message transport protocol, but no information about the intended recipient of the message is involved in this selection. In a message broker environment, any attempt to implement a solution based on U.S. Pat. No. 6,101,545 would result in many messages still being processed inefficiently because a high quality of service specified by a sender will be honoured even if not required by the recipient.

Thus, there is a need for a more efficient solution for message broker networks, which avoids the current compromise between either satisfying quality of service requirements or achieving efficient message processing.

SUMMARY OF INVENTION

In a first aspect of the present invention, there is provided a method of communication in a publish/subscribe environment in which publisher application programs send messages to subscriber application programs via one or more message brokers, the method comprising the following steps: responsive to receipt of a published message at a message broker, referring to characteristics of the received message and subscriber-specified quality of service requirements to determine an appropriate quality or service for onward transmission of the message; selecting a communication protocol in accordance with the determined quality of service; and transmitting the message using the selected communication protocol.

The method is preferably used for communicating between a first message broker and second message broker of a multi-broker network. Information relating to the quality of service requirements of the second message broker's registered subscriber applications is passed to the first broker. This preferably includes aggregate (maximum) quality of service requirements for the second broker's subscribers. It may also include aggregate quality of service requirements for other brokers which connect to the network via the second broker. This information is then used by the first broker to determine which protocol to use for communication between itself and the second broker.

Each broker may, for example, send to its connected brokers information relating to its subscriber requirements whenever its registered subscribers' requirements or its quality of service policies change. Alternatively, the requirements information may be sent periodically without checking for changes.

In preferred embodiments of the invention, brokers notify their connected brokers about the status of their connections to other brokers in the network and/or the status of those brokers (active or failed) and/or which registered subscribers are currently connected. This information can be used to determine which subset of brokers and subscribers is currently accessible via which links. This in turn can determine which subscriber requirements are currently applicable for route and protocol selections. This information can be used by a broker to decide when it is appropriate to reduce or override a requested quality of service, and to manage this dynamically based on current connection status even when the requirements of the full set of registered subscribers are unchanged.

Whether, when and how to reduce or override requested qualities of service may be managed as an administrator-defined quality of service policy for the broker. The quality of service reduction policy may be topic-specific as well as subscriber-specific, such that a high quality of service (for example, transactional message delivery) can be ensured whenever this is actually needed but low overhead communications can be used for all appropriate messages (for example, using low-overhead non-transactional delivery whenever this is adequate).

In messaging systems according to preferred embodiments of the present invention, whether a message is or is not delivered under transactional control is an important quality of service parameter. Transactionality is not conventionally recognized as a quality of service parameter in other communication environments. Whether transactional control is required can be determined from whether the message is "persistent" (i.e. the message must not be lost in the event of system or communication failures) or "non-persistent" (in which case message delivery failure is acceptable and the message does not need to survive failures). For example, a bank may require that all messages related to funds transfers and credit checks are persistent and should be delivered once and once only under transactional scope, whereas messages sent periodically to communicate the latest stock prices may be non-persistent. Messages may be sent to a broker under transactional control without being explicitly flagged as persistent.

If all currently registered subscribers (or, in some embodiments, all currently connected subscribers) do not require a specific quality of service for certain message types, then messages of that type can be sent via a communication mechanism that does not provide that quality of service—if consistent with communication policies—even if the sender indicated that the specific quality of service was appropriate. This allows the broker network to select an optimized communication mechanism and protocol for each message and for the current set of subscribers, overriding sender-specified requirements if those requirements are inappropriate for the current set of subscribers.

The present invention thus enables persistent and non-persistent messages, for example, to be sent using different communication protocols, under the control of different transport mechanisms. For example, a TCP/IP link may be used for non-persistent messages for efficiency. For messages flagged as persistent and any other messages sent to the broker under transactional scope, a communication link may be used which offers transactional delivery-assurance features of a message-oriented middleware (MOM) product such as IBM's MQSeries products.

The present invention enables message brokers to communicate with each other using more than one protocol, and to send messages via a protocol and/or transport mechanism that is selected according to a combination of:
  the characteristics of individual messages (which may be identifiable from the message itself or from the communication protocol used by, or the requirements or capabilities of, the sender—according to the embodiment); and
  the requirements of subscriber applications (which may be known by the broker either as aggregate or individual subscriber requirements, according to the embodiment).

The brokers may select an appropriate protocol to transport each individual message based on the quality of service required by both the originator and the ultimate destination applications. In particular, messages with lower qualities of service may be sent over transports which are more efficient at processing such messages, while those which require higher qualities of service may be passed over more suitable transports.

This allows the most efficient transport mechanism and protocol to be used for every message, while avoiding having to implement high qualities of service on top of transports which do not provide them.

In a second aspect, the invention provides a message broker, configured to provide a publish/subscribe service for publisher and subscriber application programs, comprising: means, responsive to receipt of a published message at the message broker, for determining an appropriate quality of service for onward transmission of the message in accordance with subscriber-specified quality of service requirements for the received message; means for selecting a communication protocol in accordance with the determined quality of service; and means for transmitting the message using the selected communication protocol.

In a third aspect, the invention provides a data processing system comprising: at least a first and a second message broker, configured to provide a publish/subscribe service for publisher and subscriber application programs, the system being configured to establish a plurality of communication connections between the first and second brokers, each connection providing a different quality of service, wherein the first message broker includes: means, responsive to receipt of a published message at the first message broker, for determining an appropriate quality of service for transmission of the message to the second broker in accordance with subscriber-specified quality of service requirements for the received message; means for selecting a communication protocol provided by one of said communication connections, in accordance with the determined quality of service; and means for transmitting the message to the second broker using the selected communication connection and protocol.

The invention may be implemented as a computer program product, comprising program code recorded on a machine readable recording medium (such as optical or magnetic media), for controlling the operation of a data processing apparatus on which the program code executes.

BRIEF DESCRIPTION OF DRAWINGS

Preferred embodiments of the invention will now be described in more detail, by way of example, with reference to the accompanying drawings in which.

DETAILED DESCRIPTION OF PREFERRED EMBODIMENTS

Figure 1:
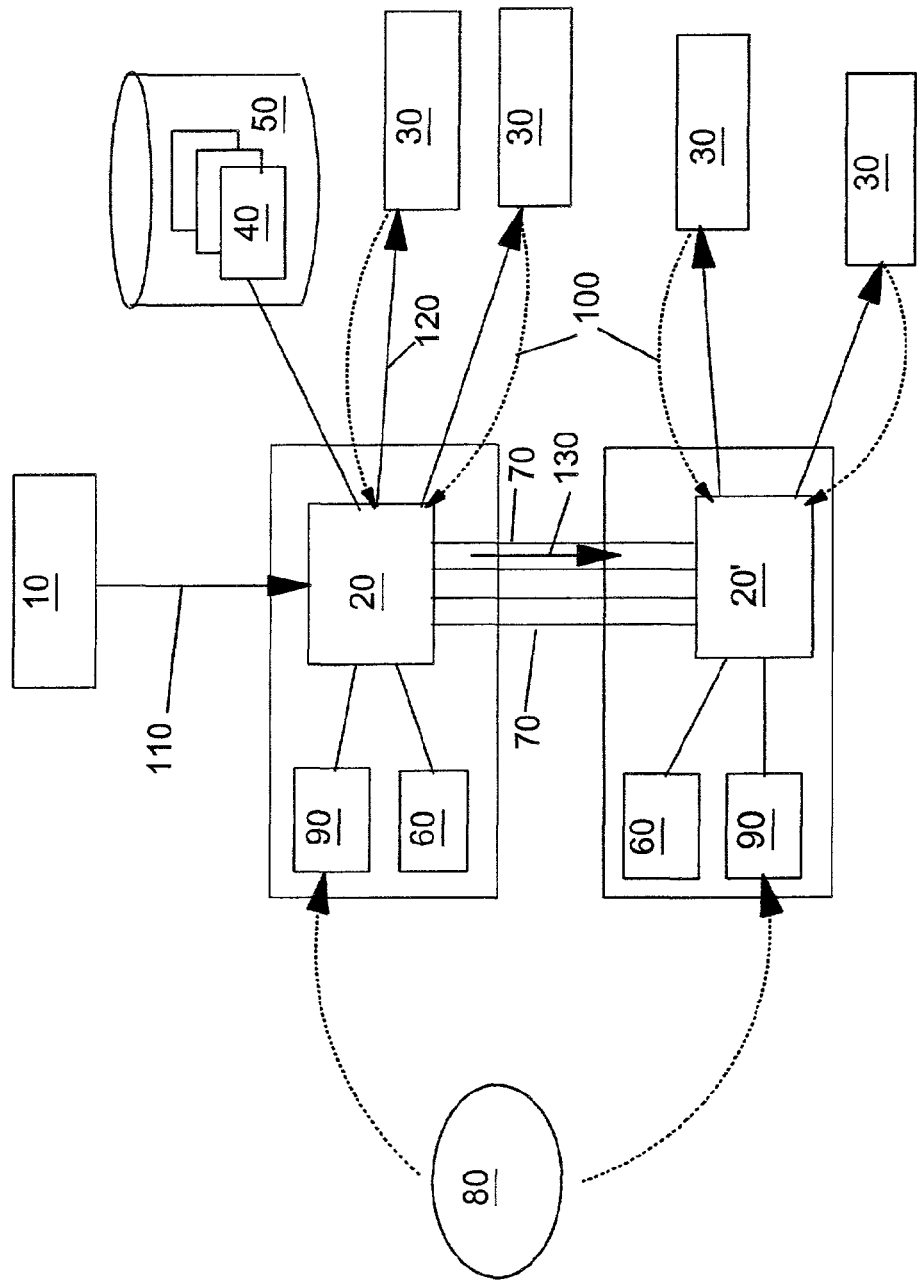
FIG. 1 is a schematic representation of a messaging network in which publisher and subscriber applications communicate via message brokers, and in which the present invention may be implemented.

The ability to rapidly adopt, integrate and extend new and existing data processing technologies has become essential to the success of many businesses. Heterogeneity and change in data processing networks has become the norm, requiring communication solutions which achieve interoperability between the different systems. Application-to-application messaging via intelligent middleware products provides a solution to this problem.

The present invention provides significant advantages in a publish/subscribe messaging environment, balancing the apparently conflicting requirements for reliable delivery of messages and optimized messaging performance by enabling a message broker to consider subscriber-specified quality of service requirements as well as message characteristics and consequently to select an appropriate communication protocol for sending each message.

The publish/subscribe paradigm was described earlier. Before describing embodiments of the present invention in more detail, a brief description of message queuing and message brokers will be helpful.

Messaging and Message Brokers

IBM Corporation's MQSeries and WebSphere MQ family of messaging products are examples of known products which support interoperation between application programs running on different systems in a distributed heterogeneous environment. Message queuing and commercially available message queuing products are described in "Messaging and Queuing Using the MQI", B. Blakeley, H. Harris & R. Lewis, McGraw-Hill, 1994, and in the following publications which are available from IBM Corporation: "An Introduction to Messaging and Queuing" (IBM Document number GC33-0805-00) and "MQSeries—Message Queue Interface Technical Reference" (IBM Document number SC33-0850-01). The network via which the computers communicate using message queuing may be the Internet, an intranet, or any computer network. IBM, WebSphere and MQSeries are trademarks of IBM Corporation.

IBM's MQSeries messaging products provide transactional messaging support, synchronizing messages within logical units of work in accordance with a messaging protocol which gives assured once and once-only message delivery even in the event of system or communications failures. MQSeries products provide assured delivery by not finally deleting a message from storage on a sender system until it is confirmed as safely stored by a receiver system, and by use of sophisticated recovery facilities. Prior to commitment of transfer of the message upon confirmation of successful storage, both the deletion of the message from storage at the sender system and insertion into storage at the receiver system are kept 'in doubt' and can be backed out atomically in the event of a failure. This message transmission protocol and the associated transactional concepts and recovery facilities are described in international patent application WO 95/10805 and U.S. Pat. No. 5,465,328.

The message queuing inter-program communication support provided by the MQSeries products enables each application program to send messages to the input queue of any other target application program and each target application can asynchronously take these messages from its input queue for processing. This achieves delivery of messages between application programs which may be spread across a distributed heterogeneous computer network, without requiring a dedicated logical end-to-end connection between the application programs, but there can be great complexity in the map of possible interconnections between the application programs.

This complexity can be greatly simplified by including within the network architecture a communications hub to which other systems connect, instead of having direct connections between all systems. Message brokering capabilities can then be provided at the communications hub to provide intelligent message routing and integration of applications. Message brokering functions typically include the ability to route messages intelligently according to business rules and knowledge of different application programs' information requirements, using message 'topic' information contained in message headers, and the ability to transform message formats using knowledge of the message format requirements of target applications or systems to reconcile differences between systems and applications.

Such brokering capabilities are provided, for example, by IBM Corporation's MQSeries Integrator and WebSphere MQ Integrator products, providing intelligent routing and transformation services for messages which are exchanged between application programs using IBM's MQSeries and WebSphere MQ messaging products. Of course, such message broker capabilities could be integrated within other components of a data processing system, such as within the operating system software.

A multi-broker topology may be used to distribute load across processes, machines and geographical locations. When there are a very large number of clients, it can be particularly beneficial to distribute those clients across several brokers to reduce the resource requirements of the brokers, and to reduce the impact of a particular server failing. The scalability and failure tolerance of such multi-broker solutions enable messages to be delivered with acceptable performance when there is a high message throughput or a broker fails. When clients are geographically separated, it can be beneficial to have brokers located local to groups of clients so that the links between the geographical locations are consolidated, and for well designed topic trees this can result in many messages not having to be sent to remote locations.

FIG. 1 shows an example message broker network in which one or many publisher applications 10 are sending 110 messages to a first message broker 20. The first message broker may have one or many subscriber applications 30 which have registered 100 their interest in receiving specified message types from the publishers. In a typical publish/subscribe message broker environment, the publisher does not explicitly identify target subscribers and may not know or care who the subscribers are. Publisher and subscriber applications do not have a dedicated end-to-end connection, and at times may not even be concurrently connected to the broker network.

Instead, publishers typically specify 110 topic names for the messages they are publishing, and subscribers specify 100 topic names for the messages they are interested in receiving. The message broker compares an incoming message with the subscription profiles 40 of the various subscribers to identify matches, and passes matching messages to an output component for forwarding to the relevant subscribers. For example, a subscriber S1 may be interested in receiving all messages related to the IBM stock price and may send a subscription request to the broker such as "Stock/IBM". The broker stores this subscription information. Then if a message arrives at the broker from a publisher and the message header includes topic identifiers "Stock/IBM" the broker will compare this message with its subscription lists, identify that the message matches the subscription profile for subscriber S1 and route the message to them.

Other message broker solutions enable content-based routing of messages (i.e. the analysis of a message by the broker is not limited to the topic information in message headers). For a topic such as "Stock/IBM", a content filter "Body.price>100" could also be used to only identify a match for published messages in which the stock price exceeds the specified value.

Whatever method is used to determine appropriate message routing, conventional message broker solutions use the same transport mechanism for all messages. For example, a message broker within IBM's MQSeries Integrator product could be configured to always send messages with transactional assured delivery under the control of IBM's MQSeries message delivery software. In this example, the message transport mechanism is able to satisfy publisher-specified requirements for transactional message delivery, which can be vital for some applications. However, there may be types of messages or sets of subscribers for which transactional message delivery is unnecessary, and in that case it would be beneficial to enable use of a low-overhead transport mechanism which is optimized for efficiency instead of delivery assurance. Some alternative publish/subscribe solutions always use a low-overhead delivery mechanism, which is efficient for non-persistent messages but fails to meet the important requirement of some applications for assured once-only message delivery under transactional scope The present invention can be implemented within a multi-broker network to provide the flexibility for selection of an appropriate protocol and transport mechanism for each message transmission between message brokers. For persistent messages which are sent to a first message broker under transactional scope, it is likely that the delivery assurance features of a transaction-oriented messaging product will be required. Unless the broker's quality of service policy dictates otherwise (see below), messages which arrive under transactional scope will be sent onwards across the network under transactional control. However, for non-persistent or non-transactional messages, it may be that delivery assurance is either not wanted at all or is only wanted if it can be achieved with a specified level of messaging performance. Known message brokers typically do not take sufficient account of such issues.

An implementation of a message broker according to the invention, and its operation within a multi-broker network, will now be described in more detail with reference to FIGS. 1 and 2.

Referring to FIG. 1, publishers 10 create messages containing a topic name. The publisher either specifies a required quality of service explicitly or the message characteristics enable an appropriate transport mechanism and quality of service to be identified implicitly. The published messages are delivered 110 to a connected message broker 20 via the identified transport mechanism. Subscribers 30 create subscriptions 40 containing a topic attribute and, optionally, a requested quality of service attribute or content filter for that topic. These subscriptions are registered 100 with the message broker, which stores them in a table format in a repository 50. The table includes quality of service requirements and filters for each topic of interest for each of the subscribers 30 that connect to the broker network via connections to that broker 20. A single subscriber 30 may register multiple subscriptions 40 with different requested qualities of service for different topics.

Each broker 20 includes a process for generating aggregate information for the subscriber quality of service requirements within its table, and for sending this aggregate requirement information to its connected message brokers 20'. On receipt of this information, the brokers update their own tables to include the aggregate requirement information for all nearest neighbour connected brokers. Thus, each broker 20 knows the maximum quality of service requirements for each of its network links, including links to a connected subscriber 30 and links 70 to another message broker 20'.

Each message broker contains one or more connection managers 60 which keeps the broker informed of the status of each of its connections 70 to the other message brokers. This information can be used by the broker for route selection, but in particular can be combined with the aggregate quality of service requirement information to determine which of the currently available connections can be used to satisfy specified quality of service requirements and which specified quality of service requirements are relevant to the currently connected set of brokers and subscribers. Additional information on further downstream connections and/or subscription state may also be passed to the brokers for further filtering of which subset of quality of service requirements are applicable to the current set of connected brokers and subscribers.

Administrators define quality of service policies 80 for message communication for particular subscribers and particular topics, including rules for determining the quality of service requirements and hence the transport mechanisms and protocols which may be used for each message. These policies are input to a configuration manager 90 associated with the broker. Rules which merely define a required quality of service for a message type or message topic are known in the art, but a significant feature of the quality of service policies implemented here is the ability to override or reduce a requested quality of service when appropriate for the current set of connected brokers and subscribers.

When a message broker 20 receives a published message, it scans its subscription tables 40 to identify the set of subscriptions which match the topic in the message, and looks up other attributes of the message which can be used to determine appropriate message processing. As noted earlier, subscriptions may contain a filtering expression on elements of the message body.

For each subscriber 30 having a registered subscription 40 which matches the message, the message broker 20 determines a delivery quality of service based on the following:

the quality of service with which the message was delivered to the broker, or attributes of the message;
the quality of service attribute of the matching subscription(s); and
the administrator-defined policy 80 for the message topic and the subscriber which registered the subscription.

For each nearest-neighbour message broker 20', the current message broker 20 determines a delivery quality of service based on:
the quality of service with which the message was delivered to the broker, or attributes of the message;
the aggregate quality of service requirements stored for the nearest neighbour broker 20';
the administrator-defined policy for the topic; and
the status of connections to the nearest neighbour broker.

Subject to the inter-broker communication strategy relating to filtering of messages based on proxy subscriptions (e.g. Unfiltered "broadcast" or applying filtering rules), the message broker delivers 120, 130 the message to each subscriber or connected message broker with the determined quality of service. Where the broker has multiple active connections to the subscriber or connected message broker, the most appropriate connection 70 for the required duality of service is selected to deliver the message, based on the policy for the topic. The selection of an appropriate filtering policy is described in commonly assigned, co-pending patent application U.S. Ser. No. 10/016,935 which is incorporated herein by reference.

Example quality of service attributes for subscriptions include the following attributes:
Always persistent
Persistent if publisher specifies persistent
Non-persistent.
Example policies include:
for topic A, all subscribers can have messages delivered with any persistence;
for topic B, subscriber 1 may only have messages delivered non-persistently;
for topic C, all subscribers must have messages delivered persistently.
Possible policies for connected brokers include:
For topic A, deliver with publisher's persistence, however if an appropriate connection is not available, use a connection with a lower quality of service if possible.
For topic C, deliver persistently, and always use an appropriate connection which meets the specified quality of service requirements (if no connection is available, the message must wait).

It should be noted that, for persistent messages, the publisher application should have sent the message to the first broker under transactional control. In that case, the broker network is required to store the message in a queue until it can be forwarded on to the destination application under transactional control (unless the administrator-defined quality of service policy says otherwise). To maintain the quality of service across all network links, transactional delivery is thus required between the first and second brokers. However, for a non-persistent and non-transactional message, a reasonable administration policy would be for the message to be sent via whichever transport mechanism is available—selecting the most efficient mechanism and protocol that is currently available (i.e. optimizing for low overhead, such as selecting a protocol which requires the minimum number of cross-network flows).

This is implemented by differentiating between three different transaction modes for messages received at the first broker. Different communication paths are then used for onward transmission of the received messages, depending on the transaction mode of the message, the requirements of relevant subscribers, and the quality of service policy for the broker. The transaction modes determine whether each instance of message processing via the broker is under transaction control. The transaction modes are:

1. Transactional
    The message flow is under transaction control.
2. Non-Transactional
    The message flow is not under transaction control.
3. Automatic
    The message flow is under transaction control only if the incoming message is marked persistent.

When messages are transported between processing nodes, the transaction mode must not be unintentionally downgraded. If the transaction mode of a message is unknown before the message is received, the message processing node that receives the message must treat the message as transactional regardless of whether this is required. This could adversely and unnecessarily affect performance of message delivery for non-transactional and non-persistent messages.

To avoid the effect on performance of treating all messages received from an adjacent node as transactional, separate communication paths are provided between nodes of the messaging system for transmission of messages of differing transaction modes. Thus, the sender would direct messages using the route that applies to the transaction mode of the message. The receiver of non-transactional messages is not required to treat the message in a transactional way, which allows the best performance for non-transactional messages. For an implementation where the processing nodes of the messaging system are message brokers, and the inter-broker communication employs message queues, the sending broker would direct messages to one of three separate queues on the adjacent broker based on the three available transaction modes of the message. The receiving broker would read messages from the non-transactional queue without the need to start a new transaction for each.

Four different connections are established between each pair of connected brokers—one TCP connection and three connections which use the message queueing delivery capabilities of a message queueing product such as IBM's MQSeries or WebSphere MQ products. The three message queueing connections have the following respective characteristics: a first connection is transactional for all messages; a second connection provides transactional control for persistent messages only; a third connection is non-transactional. Messages can be enqueued onto a queue associated with a respective one of those connections, for transfer to a neighbour message broker, after selecting a protocol based on a message's quality of service requirements.

Message Flows

The message brokers implement a sequence of processing steps on received messages using messageflows. These are sequences of processing components corresponding to paths though a message broker's program code (visually representable as a graphical sequence of processing 'nodes'), which start and end with input and output nodes. The input nodes are responsible for receiving messages from particular queues or reading messages from particular IP connections (or for receiving messages in any other way, for example by accessing shared memory, or by retrieving a file as input). The output nodes are responsible for sending messages to required destinations—either via queues, IP connections, or other transports. Message transfer between brokers results from a neighbour destination being specified with attributes which indicate which transport is required, which may be an IP connection, a queue being handled transactionally, a queue being handled non-transactionally or another mechanism. The message flows implement rule-based message processing and filtering, with a single message flow being made up of an input node, and output node and one or more processing nodes such as a matching node, a filter or a computation node.

A publisher node is one of the processing nodes which can be deployed in a message broker's message flow. Publisher nodes are a complex node including a matching node (for comparing a received message with subscription information to identify matching subscribers), and at least one output node for forwarding the message to the matching subscribers.

Message flows are created using a visual programming technology to support broker capabilities such as publish/subscribe message delivery, message transformation, database integration, message warehousing and message routing, and which greatly ease the task of management and development of message brokering solutions. A message flow represents the sequence of operations performed by the processing logic of a message broker as a directed graph (a message flow diagram) between an input queue and a target queue. The message flow diagram consists of message processing nodes, which are representations of processing components, and message flow connectors between the nodes. Message processing nodes are predefined components, each performing a specific type of processing on an input message. The processing undertaken by these nodes may cover a range of activities, including reformatting of a message, transformation of a message (e.g. adding, deleting, or updating fields), routing of a message, archiving a message into a message warehouse, or merging of database information into the message content. There are two basic types of message processing nodes: endpoints and generic processing nodes. Endpoints represent points in the message flow to which message producers may send messages (input nodes) or from which message consumers may receive messages (output nodes). Endpoints are associated with system queues and client applications interact with an endpoint by reading from or writing to these queues. Generic processing nodes take a message as input and transform it into zero, one, or more output messages. Each such message processing node has a set of InTerminals through which it receives messages, and a set (possibly empty) of OutTerminals, through which it propagates the processed message. Message processing nodes have properties which can be customized. These properties include expressions that are used by the processing node to perform it's processing on input messages.

A message flow is created by a visual programmer using visual programming features of the message broker. This involves placing message processing nodes on a drawing surface, and connecting the out terminal of one node to the in terminal of another node. These connections determine the flow of the messages through the message processing nodes. A message flow can contain a compound message processing node which is itself a message flow. In this way message flows can be built modularly, and specific message processing functionality can be reused.

Message flows are executed by an execution engine that can read a description of a message flow, and invoke the appropriate runtime code for each message processing node. This will be referred to later. Each message flow has a thread pool which can be configured to have between 1 and 256 threads. When an input node for a message flow is constructed it takes one thread from its thread pool and uses it to listen to the input queue. A single thread carries a message from the beginning of the flow through to the end, and hence the thread can be used to identify the message as it passes through the flow.

The queuing of an input message on that input queue initiates execution of the message flow on the queued message. The message is then propagated to the target nodes of the connectors originating from the output terminal of the input node. If there is more than one outgoing connector, copies of the message are created and handled independently by the subsequent nodes. If the node is an output node, the message is delivered to the associated message queue; otherwise the processing node will create zero or more output messages for each of its output terminals. Messages are propagated to subsequent nodes as described above.

A message processing node will process an input message as soon as it arrives and retain no information about the message when it has finished its processing. A processing node might output more than one message of the same type through an output terminal and several copies of the same message might be propagated if there is more than one connector originating from an output terminal; all of these messages are processed independently of each other. A processing node does not necessarily produce output messages for all of its output terminals—often it will produce one output for a specific terminal depending on the specific input message. Also, a node might produce messages for output terminals that are not connected to other processing nodes, in which case the message is not processed further.

Figure 2:
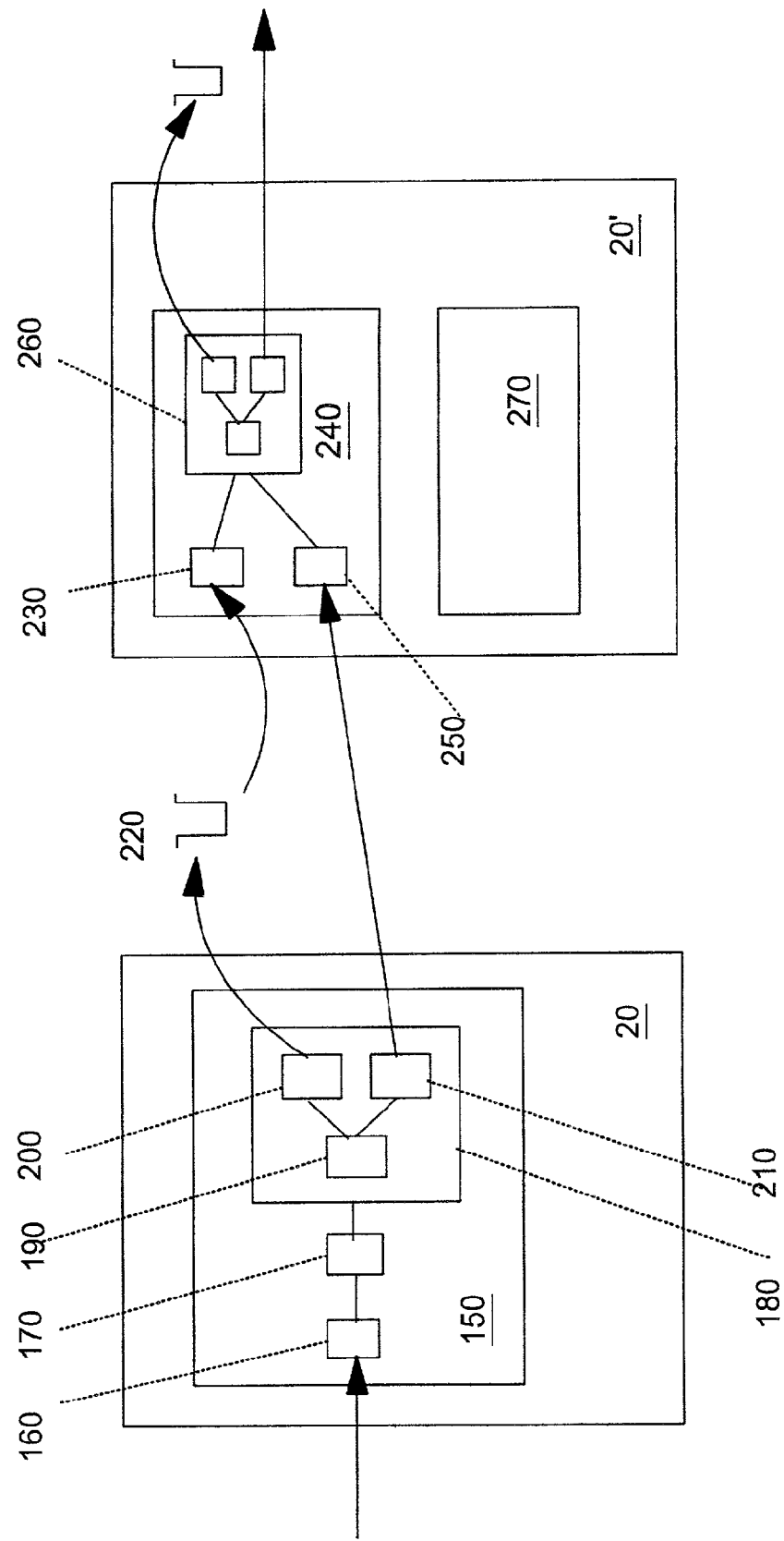
FIG. 2 is a schematic message flow representation of processing components within a pair of message brokering systems according to an embodiment of the invention.

As shown in FIG. 2, a message broker 20 implementing the present invention in a multi-broker environment includes a first message flow 150 which is within the message brokering system's user space. This message flow includes an input node 160, a processing node 170 (e.g. a formatter), and a publisher node 180. The publisher node is made up of matcher 190 and two output nodes 200, 210.

The matcher 190 checks received messages against the subscription information 40 held in a repository 50 (as shown in FIG. 1) to identify matching subscribers, and routes the message to one or other of the output nodes 200, 210 according to whether the message is to be forwarded by transactional store-and-forward messaging or via TCP/IP communications. The first output node 200 receives messages determined to require transactional messaging, and implements a put operation to place the message in a message queue 220. The message will either be retrieved directly from this queue by local subscriber application programs or will be transferred to a message queue which is accessible by subscriber application programs. Subject to proxy-subscription filtering, the message will also be transferred from queue 220 to an input node 230 of a neighbouring message broker 20'. The example message flow 240 in this case is internal to the broker 20' (i.e. not in user space) and its role is limited to the distribution of messages between brokers and subscribers. It includes an input node for transactional store-and-forward messaging 230, an input node 250 for TCP/IP messaging, and a publisher node 260 which includes a matcher and two output nodes. This broker 20' will typically also include one or more user-space message flows 270.

The second output node 210 sends messages via a TCP connection to an input node 250 of each neighbour message broker 20'. No proxy-subscription-based filtering is performed prior to sending the TCP messages, such that the communication strategy is to broadcast to all connected brokers.

Thus, two or more inter-broker communication links are established between neighbour brokers. A message filtering policy can be selected for each link, in accordance with either the link itself, the communication protocol to be used for communication across the link, or the message topic.

It will be understood by persons skilled in the art, that various modifications may be made to the methods, message brokers and messaging systems described above within the scope of the present invention. For example, the above described embodiment involved each message broker sending aggregate subscriber requirement information to its connected brokers such that each message broker can take account of those requirements for the next 'hop' of a message from a broker to a connected neighbour broker. An alternative embodiment is for aggregate requirements to be propagated throughout the network, such that each broker knows the maximum quality of service requirements for any subscriber which is accessible via each of its network links, including subscribers which are only reachable by multiple intermediary systems (multiple 'hops' across the network). Another embodiment builds a database containing quality of service requirements for all subscribers, with each broker having access to that database and holding network topology information for determining a complete network route from the current broker to each registered subscriber in the network.

The embodiment described above provided four different connections between a pair of brokers—one of which is a TCP connection plus three message queueing connections which each have their own input queue. In another implementation, if the message delivery mechanisms enabled retrieval of a message from a queue (GetMessage) with a determination of whether this GetMessage should be under transactional scope being based on whether the message was put on the queue under transactional scope, then only one queue would be needed for all messages to be sent via message queueing.

What is claimed is:

1. A method of communication in a publish/subscribe environment in which publisher programs send messages to subscriber programs via one or more message brokering systems, the method comprising the following steps:
responsive to receipt of a published message at a message broker, referring to characteristics of the received message and subscriber-specified quality of service requirements to determine an appropriate quality of service for onward transmission of the message;
selecting a communication protocol in accordance with the determined quality of service; and
transmitting the message using the selected communication protocol, wherein
the message broker determines said appropriate quality of service by determining which subset of subscribers are currently connected to the message brokering system and referring to the subscriber-specified quality of service requirements for only the currently connected subset of subscribers, and for communication between first and second message brokering systems in a multi-broker network,
the first message brokering system is configured to access a repository storing subscriber-specified quality of service requirements for subscriber programs which connect to the broker network via the second message brokering system and wherein the first message brokering system determines a quality of service for the communication by referring to the subscriber-specified quality of service requirements for the subscriber programs which connect to the broker network via the second message brokering system and by referring to connection status information for connections between the first and second brokering systems,
the subscriber-specified quality of service requirements include an indication of whether transactional message delivery is required, and wherein the protocol selecting step comprises selecting a transactional communication protocol at least for transactional messages which match subscriptions including said transactional message delivery requirement, for only the currently connected subset of subscribers.

2. A method of communication in a publish/subscribe environment in which publisher programs send messages to subscriber programs via one or more message brokering systems, the method comprising the following steps:
responsive to receipt of a published message at a message broker, referring to characteristics of the received message and subscriber-specified quality of service requirements to determine an appropriate quality of service for onward transmission of the message;
selecting a communication protocol in accordance with the determined quality of service; and
transmitting the message using the selected communication protocol, wherein
the message broker determines said appropriate quality of service by determining which subset of subscribers are currently connected to the message brokering system and referring to the subscriber-specified quality of service requirements for only the currently connected subset of subscribers, and
the subscriber-specified quality of service requirements include an indication of whether transactional message delivery is required, and wherein the protocol selecting step comprises selecting a non-transactional communications protocol for messages for which matching subscriptions do not include said transactional message delivery requirement, for only the currently connected subset of subscribers.

3. The method according to claim 2, wherein the protocol selecting step comprises selecting a non-transactional communications protocol for any messages marked as non-persistent and for any messages for which matching subscriptions do not include said transactional message delivery requirement.

4. A method of communication in a publish/subscribe environment in which publisher programs send messages to subscriber programs via one or more message brokering systems, the method comprising the following steps:
responsive to receipt of a published message at a message broker, referring to characteristics of the received message and subscriber-specified quality of service requirements to determine an appropriate quality of service for onward transmission of the message;
selecting a communication protocol in accordance with the determined quality of service; and
transmitting the message using the selected communication protocol, wherein
for communication between first and second message brokering systems in a multi-broker network,
the first message brokering system is configured to access a repository storing subscriber-specified quality of service requirements for subscriber programs which connect to the broker network via the second message brokering system, and wherein the first message brokering system determines a quality of service for the communication by referring to the subscriber-specified quality of service requirements for the subscriber programs which connect to the broker network via the second message brokering system and by referring to connection status information for connections between the first and second brokering systems.

5. The method according to claim 4, wherein the second brokering system sends to the repository aggregate quality of service requirements for the set of subscriber programs which connect to the broker network via the second message brokering system.

6. The method according to claim 5, wherein each brokering system in a multi-broker network sends to its connected message brokering systems aggregate quality of service requirements for the set of subscriber programs which are accessible via that brokering system.

7. The method according to claim 4, wherein the second brokering system sends to the repository subscriber-specific quality of service requirements for each subscriber program which connects to the broker network via the second message brokering system.

8. The method according to claim 4, wherein the second brokering system sends to the repository separate quality of service requirements for each of a plurality of different topics or topic groups.

9. The method according to claim 4, wherein the subscriber-specified quality of service requirements include an indication of whether transactional message delivery is required, and wherein the protocol selecting step comprises selecting a transactional communication protocol for transactional messages which match subscriptions including said transactional message delivery requirement.

10. The method according to claim 9, wherein a non-transactional message delivery protocol is selected for any messages for which matching subscriptions do not include said transactional message delivery requirement.

11. The method according to claim 4, including applying one or more override policy rules to determine whether to override a specified quality of service when no communication connections are available which provide the specified quality of service.

12. The method according to claim 11, wherein the override policy rules are message topic specific.

13. The method according to claim 11, wherein the override policy rules are subscriber specific.

14. The method according to claim 4, wherein the first and second message brokering systems are configured for establishing a plurality of communication connections therebetween, each connection providing a different quality of service, and wherein the selection of a communication protocol by the first message brokering system includes determining which of the plurality of connections are currently available for sending a message to the second brokering system and selecting a communication protocol provided by a currently available connection in accordance with the determined quality of service.

15. The method according to claim 14, including applying one or more override policy rules to determine whether to override a specified quality of service when no communication connections are currently available which provide the specified quality of service.

16. A data processing system comprising:
at least a first and a second message brokering systems, configured to provide a publish/subscribe service for publisher and subscriber programs, the data processing system being configured to establish a plurality of communication connections between the first and second brokering systems, each connection providing a different quality of service, wherein the first message brokering system is configured to:
responsive to receipt of a published message at the first message brokering system, determine an appropriate quality of service for transmission of the message to the second brokering system in accordance with subscriber-specified quality of service requirements for the received message;
select a communication protocol provided by one of said communication connections, in accordance with the determined quality of service; and
transmit the message to the second brokering system using the selected communication connection, wherein
the first message brokering system is configured to access a repository storing subscriber-specified quality of service requirements for subscriber programs which connect to the broker network via the second message brokering system and wherein the first message brokering system determines a quality of service for the communication by referring to the subscriber-specified quality of service requirements for the subscriber programs which connect to the broker network via the second message brokering system and by referring to connection status information for connections between the first and second brokering systems.

* * * * *